(12) United States Patent
Liu

(10) Patent No.: US 11,078,584 B2
(45) Date of Patent: Aug. 3, 2021

(54) SYSTEMS AND METHODS OF ELECTROLYTIC PRODUCTION OF ALUMINUM

(71) Applicant: Alcoa USA Corp., Pittsburgh, PA (US)

(72) Inventor: Xinghua Liu, Murrysville, PA (US)

(73) Assignee: ALCOA USA CORP., Pittsburgh, PA (US)

( * ) Notice: Subject to any disclaimer, the term of this patent is extended or adjusted under 35 U.S.C. 154(b) by 335 days.

(21) Appl. No.: 15/943,171

(22) Filed: Apr. 2, 2018

(65) Prior Publication Data

US 2018/0282889 A1    Oct. 4, 2018

Related U.S. Application Data

(60) Provisional application No. 62/479,905, filed on Mar. 31, 2017.

(51) Int. Cl.
 *C25C 3/08* (2006.01)
 *C25C 3/12* (2006.01)
 *C25C 7/02* (2006.01)

(52) U.S. Cl.
 CPC . *C25C 3/12* (2013.01); *C25C 7/02* (2013.01)

(58) Field of Classification Search
 CPC .. C25C 3/08; C25C 3/06; C25C 7/005; C25C 7/00; C25B 9/12; C25B 11/02; C25B 9/00; C25B 9/06
 See application file for complete search history.

(56) References Cited

U.S. PATENT DOCUMENTS

| 3,215,615 | A | * | 11/1965 | Charles | C25C 3/16 204/279 |
| 3,856,650 | A | | 12/1974 | Kugler et al. | |
| 5,043,047 | A | * | 8/1991 | Stedman | C25C 3/08 204/247.3 |
| 5,362,366 | A | | 11/1994 | de Nora et al. | |
| 6,162,334 | A | | 12/2000 | Ray et al. | |
| 6,372,119 | B1 | | 4/2002 | Ray et al. | |
| 6,416,649 | B1 | | 7/2002 | Ray et al. | |

(Continued)

FOREIGN PATENT DOCUMENTS

| EP | 0892085 A2 | 1/1999 |
| WO | WO2017/223348 | 12/2017 |
| WO | WO2018/009862 | 1/2018 |

OTHER PUBLICATIONS

International Search Report and Written Opinion, dated Jun. 25, 2018, from corresponding International Patent App. No. PCT/US2018/025687.

(Continued)

*Primary Examiner* — Zulmariam Mendez
(74) *Attorney, Agent, or Firm* — Greenberg Traurig, LLP

(57) ABSTRACT

In some embodiments, an exemplary electrolytic cell includes: a cathode structure disposed within an electrolysis cell, wherein the electrolysis cell is configured to produce metal on a surface of the cathode structure, wherein the cathode structure is configured to fit along a floor of the electrolysis cell, wherein the cathode structure has a sloped surface when compared to a generally horizontal plane, and wherein via the sloped surface, the cathode structure is configured to drain a metal product from the sloped surface towards a lower end of the cathode structure.

23 Claims, 11 Drawing Sheets

(56) References Cited

U.S. PATENT DOCUMENTS

| | | | |
|---|---|---|---|
| 6,423,195 | B1 | 7/2002 | Ray et al. |
| 6,428,676 | B1 * | 8/2002 | Onuoha ............... C25B 1/00 204/252 |
| 6,436,273 | B1 | 8/2002 | de Nora et al. |
| 6,511,590 | B1 | 1/2003 | Troup et al. |
| 6,758,991 | B2 | 7/2004 | DiMilia et al. |
| 6,821,312 | B2 | 11/2004 | Ray et al. |
| 6,866,766 | B2 | 3/2005 | LaCamera et al. |
| 7,014,881 | B2 | 3/2006 | Liu et al. |
| 7,033,469 | B2 | 4/2006 | Weirauch, Jr. et al. |
| 7,179,353 | B2 | 2/2007 | Barclay et al. |
| 7,235,161 | B2 | 6/2007 | DiMilia et al. |
| 7,384,521 | B2 | 6/2008 | Wang et al. |
| 7,507,322 | B2 | 3/2009 | DiMilia et al. |
| 7,799,189 | B2 | 9/2010 | Barclay et al. |
| 7,820,027 | B2 | 10/2010 | Barclay et al. |
| 9,340,887 | B2 | 5/2016 | Liu et al. |
| 9,771,659 | B2 | 9/2017 | Liu et al. |
| 9,957,627 | B2 | 5/2018 | Liu et al. |
| 10,151,039 | B2 | 12/2018 | Liu et al. |
| 10,407,786 | B2 | 9/2019 | DeYoung et al. |
| 10,415,147 | B2 | 9/2019 | Liu |
| 2004/0163967 | A1 | 8/2004 | LaCamera et al. |
| 2004/0216977 | A1 | 11/2004 | Farachi et al. |
| 2007/0045104 | A1 | 3/2007 | Wang et al. |
| 2008/0017504 | A1 | 1/2008 | Liu et al. |
| 2008/0020265 | A1 | 1/2008 | Liu et al. |
| 2016/0258072 | A1 | 9/2016 | Liu et al. |
| 2018/0209056 | A1 | 7/2018 | Liu et al. |
| 2018/0282889 | A1 | 10/2018 | Liu |
| 2019/0032232 | A1 | 1/2019 | Liu et al. |
| 2019/0096918 | A1 | 3/2019 | Liu |
| 2019/0169761 | A1 | 6/2019 | Liu |
| 2019/0376197 | A1 | 12/2019 | DeYoung et al. |

OTHER PUBLICATIONS

Aluminum—New Processes and Materials, Extractive Metallurgy of Aluminum, vol. 2, ed. Gary Gerard, John Wiley & Sons, publishers, 1963, pp. 500-501.

* cited by examiner

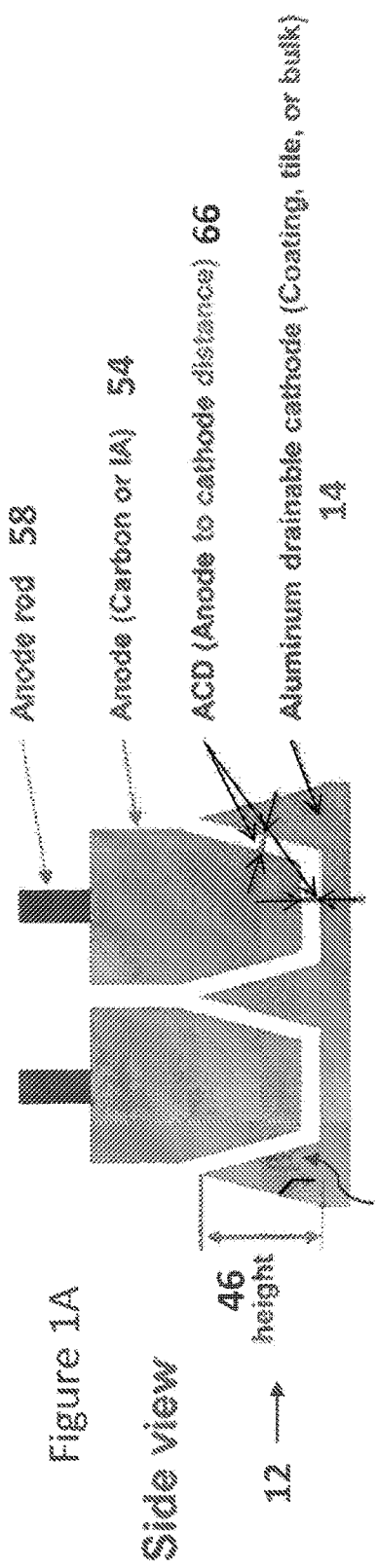
Figure 1A
Side view
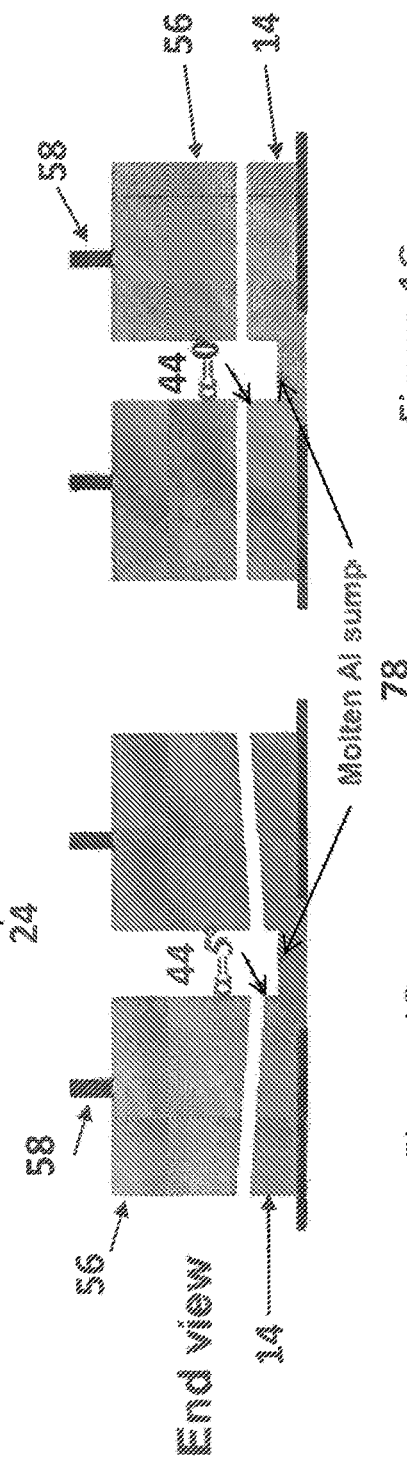
Figure 1B
End view
Figure 1C

Projected performances of a specific Soderberg smelter vs retrofitting and Greenfield of the technology Projected performances of a specific Pre-bake smelter vs retrofitting and Greenfield of the technology

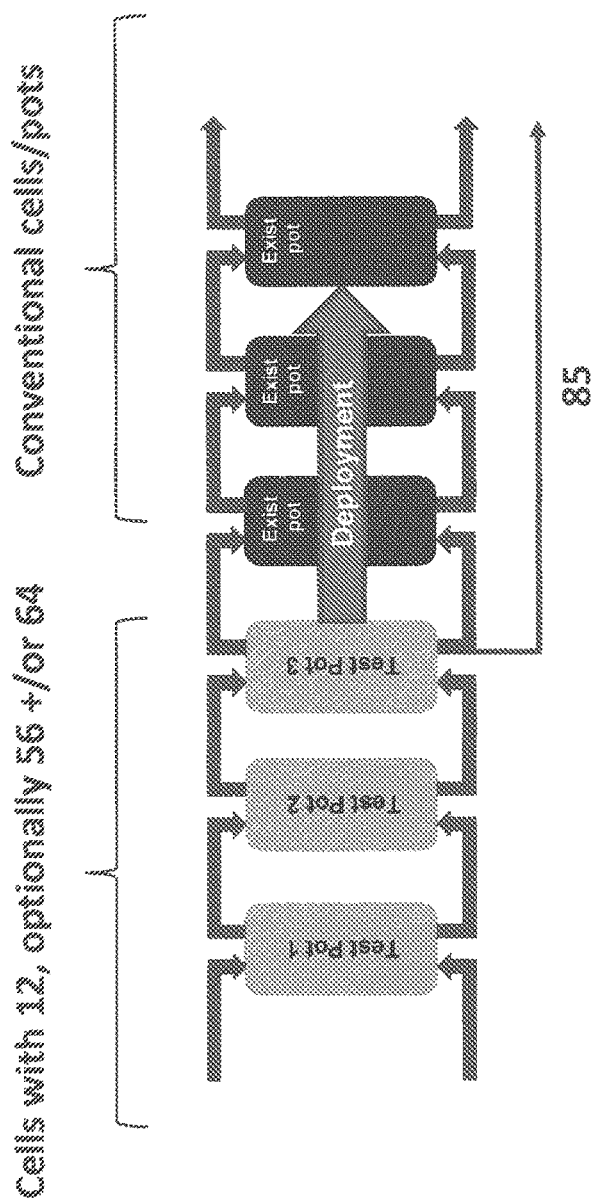

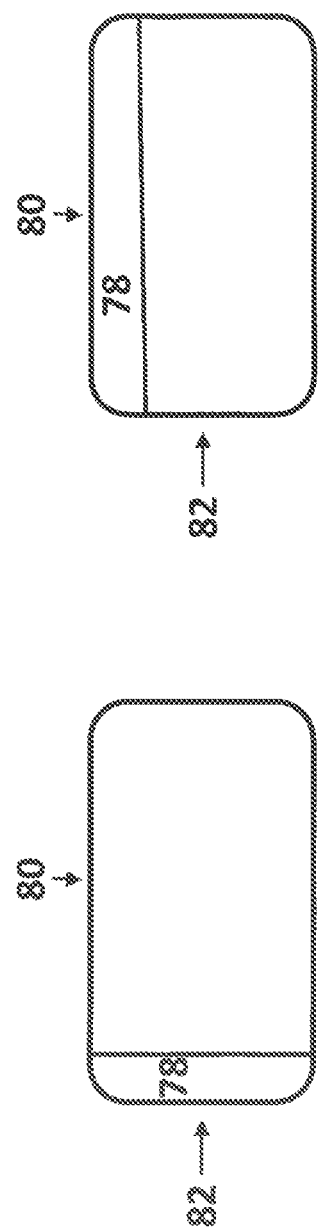
Figure 9A
Figure 9B
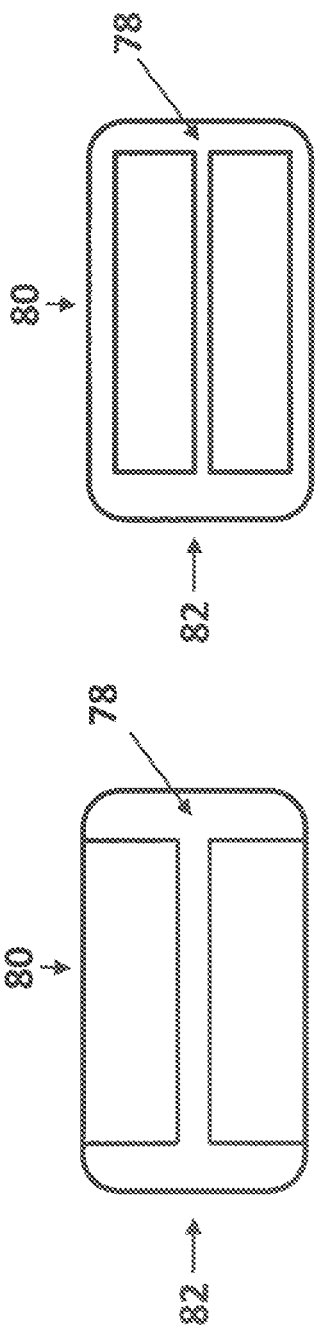
Figure 9C
Figure 9D

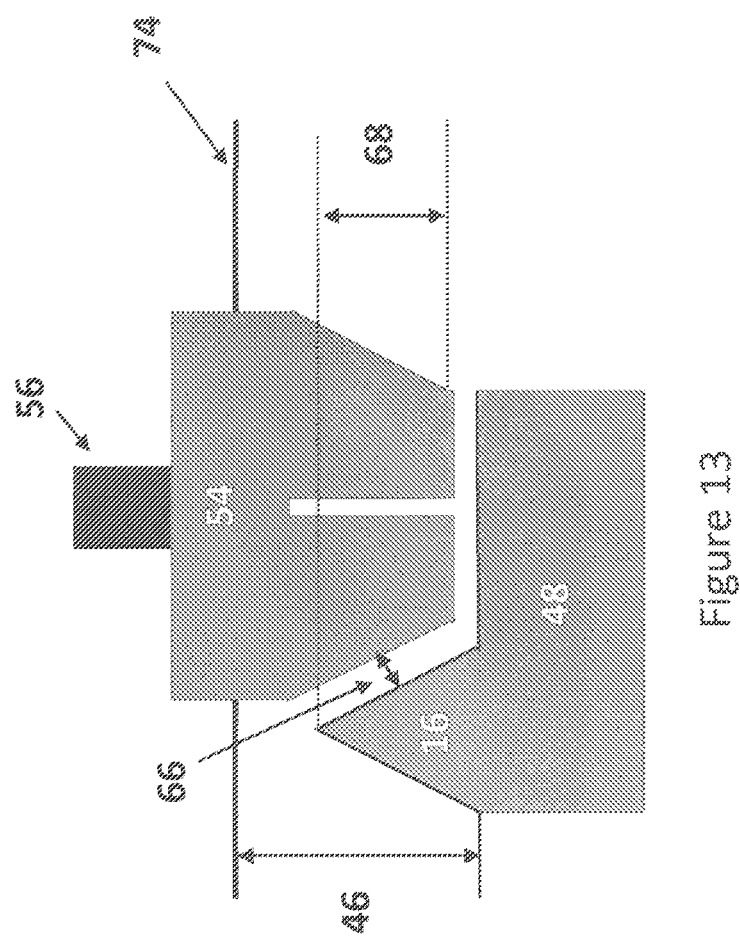

Graphite anode with flat bottom @ 3/8" ACD

Carbon anode with slotted bottom @ 3/4" ACD

SYSTEMS AND METHODS OF ELECTROLYTIC PRODUCTION OF ALUMINUM

CROSS-REFERENCE TO RELATED APPLICATIONS

This application claims benefit to U.S. provisional application 62/479,905 filed Mar. 31, 2017, which is herein incorporated by reference in its entirety.

SYSTEMS AND METHODS OF ELECTROLYTIC PRODUCTION OF ALUMINUM ACKNOWLEDGEMENT OF U.S. GOVERNMENT FUNDING

This invention was made at least in part in performance of Contract Nos. DE AR0000406 issued by the U.S. Department of Energy. The U.S. Government has certain rights in this invention.

FIELD OF THE INVENTION

Generally, the present disclosure is directed towards various embodiments of an electrolytic cell having aluminum drainable cathodes. More specifically, the present disclosure is directed towards utilizing novel cathode structures (e.g. aluminum drainable cathodes) in an electrolysis cell to enable molten aluminum production on the surface of the cathode structures with combined draining of the molten aluminum to a collection area for collection.

BACKGROUND

Commercial aluminum electrolysis pots use carbon blocks as the cathodes, and a molten aluminum metal pad as the cathode (positioned over a carbon block at the bottom of the cell). Molten aluminum is produced at the interface between the electrolyte and the molten aluminum pad in a two-dimensional ("2D") configuration, resulting in low metal productivity and requiring a large footprint facility. Waves of the liquid metal pad (cathodically polarized by contact with the cathode), caused by the instability of magnetic field created by extremely high current, and prevents operation of the cell at a small anode to cathode distance. Combining the high anode-to-cathode distance with high electrical resistance of the molten electrolyte, the voltage drop between the anodes to cathodes is high, and therefore leads to high energy consumption of the electrolysis cell.

SUMMARY OF THE INVENTION

In some embodiments, an apparatus, includes: a cathode structure disposed within an electrolysis cell, wherein the electrolysis cell is configured to produce metal on a surface of the cathode structure (metal is also produced on the surface of the floor of the cell), wherein the cathode structure is configured to fit along a floor of the electrolysis cell, wherein the cathode structure has a sloped surface when compared to a generally horizontal plane, wherein via the sloped surface, the cathode structure is configured to drain a metal product from the sloped surface towards a lower end of the cathode structure, and wherein the lower end of the cathode structure connects to the floor of the electrolysis cell.

In some embodiments, the cathode structure has a triangular geometry.

In some embodiments, the sloped surface of the cathode structure has a wall angle of 15 degrees to not greater than 89 degrees.

In some embodiments, a height of the cathode structure is from 5% to 95% of a height of a molten bath within the electrolytic cell.

In some embodiments, an upper end of the cathode structure is angled.

In some embodiments, the upper end of the cathode structure has an arcuate edge.

In some embodiments, the cathode structure is a monolithic member (e.g. ceramic or composite) attached to the floor of the electrolytic cell.

In some embodiments, the lower end of the monolithic member comprises a mechanical attachment device configured to enable mechanical attachment of the monolithic member to the cell floor.

In some embodiments, the lower end of the monolithic member comprises a an adhesive configured to enable mechanical attachment of the monolithic member to the cell floor.

In some embodiments, the cathode structure comprises at least two cathode plates attached to a support member, wherein the cathode plates, and not the support member, are in contact with the molten electrolyte bath.

In some embodiments, the cathode structure comprises at least two cathode plates mechanically attached to the cell floor, wherein the at least two cathode plates and the cell bottom define an empty volume.

In some embodiments, the cathode assembly comprises a plurality of cathode structures configured in a generally parallel, interspaced configuration along the floor of an electrolysis cell.

In some embodiments, the cathode structures are configured as part of carbon blocks along the floor of the cell, with an aluminum wettable coating covering the carbonaceous material.

In some embodiments, the cathode structures are configured as non-aluminum wettable components along the floor of the cell, with an aluminum wettable coating covering the non-aluminum wettable components.

In some embodiments, the cathode structures comprise a plurality of tiles adhered into place over a carbon block with an adhesive such that the adhesive and tiles cooperate in the cathode wall angle as a metal drained cathode surface.

In some embodiments, the metal produced at the cathode structure flows to a floor of the cell, wherein the floor has a cathode drain angle.

In some embodiments, a collection area is positioned adjacent to a cathode area in the electrolytic cell, wherein the cathode drain angle is configured to direct metal product to the collection area.

In some embodiments, the cathode drain angle is from 0 degree to 15 degrees.

In some embodiments, an apparatus, includes: a cathode assembly comprising a cathode structure electrically configured in an aluminum electrolysis cell to electrolytically participate in metal production, wherein the metal is produced on a surface of the cathode structure, wherein the cathode structure is configured to fit along a floor of the aluminum electrolysis cell, further wherein the cathode structure has a cathode wall angle with a sloped configuration when compared to a generally horizontal plane, wherein via the cathode wall angle, the cathode structure is configured to drain a metal product from a surface thereof towards the floor of the cell, and wherein the cathode structure is further configured with a cathode drain angle along the floor of the cell, such that the metal product drained via the cathode wall angle is further directed along the floor of the cell by the cathode drain angle into a collection area positioned adjacent to a cathode area in the electrolytic cell.

In some embodiments, the collection area is located along an inner region of the cathode assembly.

In some embodiments, the collection area is located at least one of: along at least one sidewall of the cell, along at least one end wall of the cell.

In some embodiments, the cathode assembly is configured with a horizontal portion between the cathode structure and the collection area.

In some embodiments, the apparatus further comprises: an anode assembly, configured from a plurality of anodes, wherein each anode is a monolithic block of carbon having an anode profile configured to correspond to the cathode wall angle of the cathode assembly; wherein the cathode structures of the cathode assembly and the anodes of the anode assembly are separated by an anode-to-cathode distance filled with molten electrolyte.

In some embodiments, an anode-to-cathode distance is ¼" to 2".

In some embodiments, anode profile is configured with beveled edges.

In some embodiments, each anode is further configured with at least one anode slot configured along a lower end of the anode, which are configured to direct bubbles and/or trapped gasses away from the lower end of the anode and into the molten electrolyte bath.

In some embodiments, a method, includes: during rebuild of an electrolytic cell, mechanically attaching a cathode assembly to a cell bottom, wherein the cathode assembly is configured with a plurality of cathode structures constructed of an aluminum wettable material, wherein each cathode structure comprises a cathode wall angle to promote a metal product to drain from an upper or middle portion of the cathode structure to a lower portion of the cathode structure; and after the electrolytic cell is preheated, positioning an anode assembly comprising a plurality of anodes, wherein the anodes are configured with a beveled edge corresponding generally to the cathode wall angle, such that the anode-to-cathode distance is constant whether measured between the corresponding generally horizontal portions of the cathode assembly and anodes or when measured between the cathode structures having a cathode wall angle and the beveled edge of the anodes.

In some embodiments, the method further comprises heating a molten salt bath configured in the cell; feeding a feedstock material into the cell, wherein the feedstock contains a metal compound (e.g. alumina) of the desired metal product (e.g. aluminum metal); and electrolytically producing metal in the cell (e.g. to transform the metal compound containing feedstock material into a metal product via electrolysis).

In some embodiments, one or more cathode assemblies are retrofitted into an existing electrolysis cell for metal production.

BRIEF DESCRIPTION OF THE DRAWINGS

These and/or other aspects and advantages of the present invention will become apparent and more readily appreciated from the following description of the various embodiments, taken in conjunction with the accompanying drawings in which:

FIG. 1A-C depicts various embodiments of a cathode structure and corresponding anode structure/anode profiles in accordance with the instant disclosure. In FIG. 1A, the complementary anode profile is depicted compared to the cathode structure (plurality of cathode members configured along the cell bottom and/or cathode block). Alternative embodiments for configuring the cathode members of the cathode assembly are referenced in FIG. 1A. FIGS. 1B and 1C depict alternative embodiments, where 1B provides a drain angle on the cathode structure and 1C does not (though both have a collection portion/sump depicted).

FIG. 2A provides a comparative example of a specific Soderberg smelter vs. retrofitting and Greenfield of the Soderberg technology with sloped anode and sloped cathode cell configurations described herein.

FIG. 2B, provides a comparative example of a specific Pre-bake cell smelter vs. retrofitting and Greenfield of the Pre-bake cell technology with sloped anode and cathode configurations described herein.

FIG. 3 depicts one or more embodiments in use, as applied to an existing smelting line, wherein each cell, one-by-one, can be retrofitted while the remaining cells in the line remain in use with conventional technology. In this configuration, one or more embodied configurations can be deployed cell-by-cell while the remainder of the line remains in use, to increase efficiency while not completely converting (retrofitting) all cells in a line at one time (i.e. which would require the line to be down).

As depicted in FIG. 3, in a partially converted pot line, the cells equipped with conventional cells are also configured with an auxiliary line/auxiliary bus, which is routed to a rectifier to address differences in current that the advanced smelting cells (with embodiments of the current disclosure) and conventional smelting cells (which operate without cathode structures of the present disclosure).

As depicted in FIG. 3, one or more embodiments of the instant disclosure enable flexible options to retrofit the technology into existing smelter based on minimum capital investment to achieve maximum performance and financial improvement of a line. As shown in FIG. 3, the new cell/pot with advanced technology can be retrofitted into exist pot line through pot-by-pot, or section by section change-out.

Figure 4:
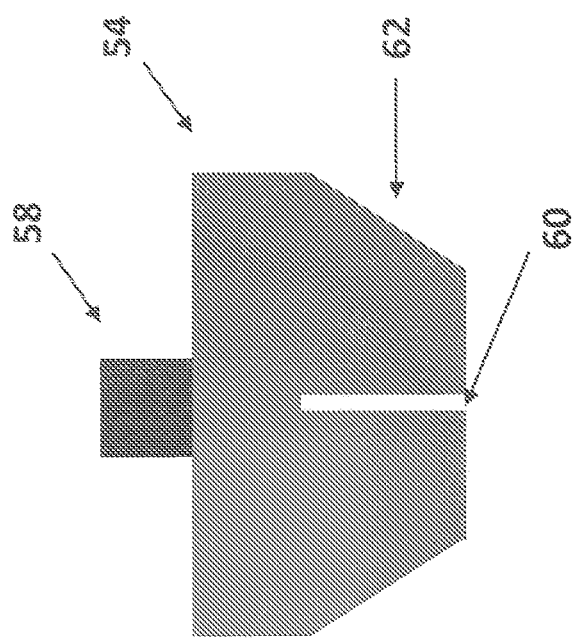

FIG. 4 depicts a plan side view of an anode having an anode profile corresponding to a cathode profile, further illustrating the beveled/angled edges of the anode block and an anode slot that is configured in the lower-most anode surface and extending upwards towards the anode body, in accordance with an embodiment of the present disclosure.

Figure 5B:
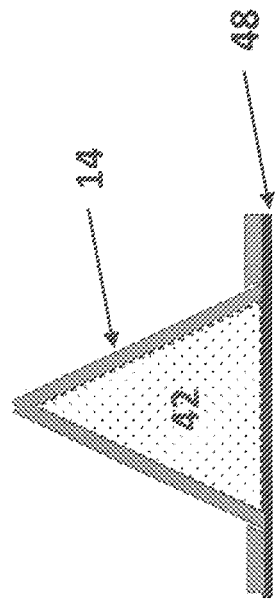
Figure 5D:
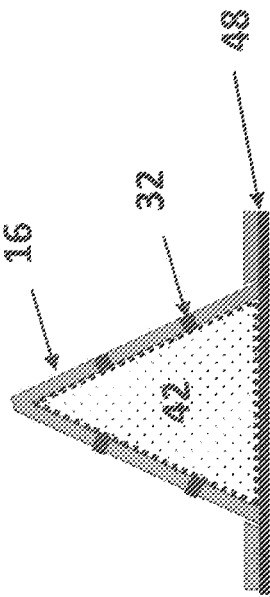
Figure 5A:
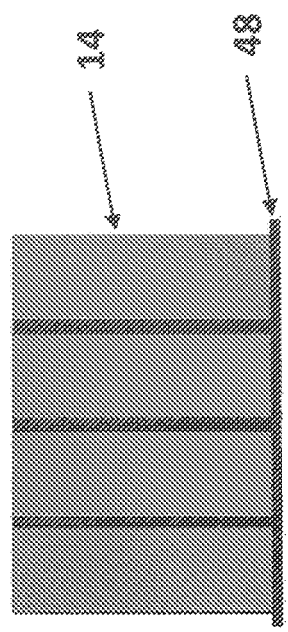

FIG. 5A depicts an embodiment of a cathode structure end view, depicting a plurality of aluminum wettable cathode tiles configured along the surface of the cathode assembly end, and configured (attached in place) with adhesive containing an aluminum wettable additive and/or refractory component, in accordance with the instant disclosure. As depicted in FIG. 5A, the cathode tiles generally extend continuously from the upper most portion of the cathode structure to the lower most end of the cathode structure (e.g. adjacent to the cell floor), in accordance with the instant disclosure.

FIG. 5B depicts the cut away side view of the cathode structure of FIG. 5A, showing the cathode tiles configured/attached with adhesive onto the surface of the support member which is enclosed beneath (contained within) the cathode tiles and adhesive, in accordance with the instant disclosure.

Figure 5C:
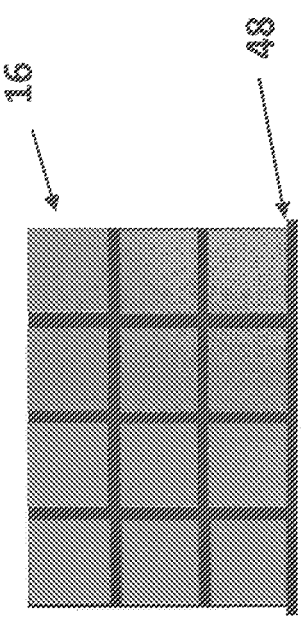

FIG. 5C depicts an embodiment of a cathode structure end view, depicting a plurality of aluminum wettable cathode tiles configured along the surface of the cathode assembly end, and configured (attached in place) with adhesive containing an aluminum wettable additive and/or refractory component, in accordance with the instant disclosure.

As depicted in FIG. 5C, the cathode tiles are generally configured vertically and horizontally and adhered onto the surface of the cathode support to form the cathode structure (e.g. adjacent to the cell floor), in accordance with the instant disclosure.

FIG. 5D depicts the cut away side view of the cathode structure of FIG. 5C, showing the cathode tiles configured/attached with adhesive onto the surface of the support member which is enclosed beneath (contained within) the cathode tiles and adhesive, in accordance with the instant disclosure.

Also depicted are aluminum wettable portions that are configured to extend across the generally flat cell floor, and connect each cathode structure (e.g. at its lower most end) the next cathode structure (e.g. at its lower most end) with an aluminum wettable portion (e.g. members, tiles, aluminum wettable coatings, an/or combinations thereof), in accordance with the instant disclosure.

Figure 6:
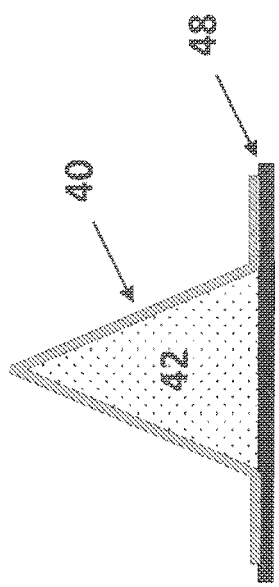

FIG. 6 depicts a cut away side view of an embodiment of a cathode structure, wherein a cathodic coating (aluminum wettable coating) is configured onto (e.g. painted, sprayed, brushed, rolled, and/or combinations thereof) the surface of a support member, in accordance with the instant disclosure.

Also depicted are aluminum wettable portions that are configured to extend across the generally flat cell floor, and connect each cathode structure (e.g. at its lower most end) the next cathode structure (e.g. at its lower most end) with an aluminum wettable portion (e.g. members, tiles, aluminum wettable coatings, and/or combinations thereof), in accordance with the instant disclosure.

Figure 7:
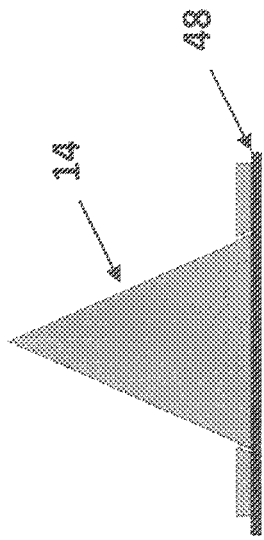

FIG. 7 depicts a cut away side view of an embodiment of a cathode assembly, wherein the cathode member is a monolithic block that is configured onto the cell floor, in accordance with the instant disclosure. Also, depicted are aluminum wettable portions that are configured to extend across the generally flat cell floor, and connect each cathode structure (e.g. at its lower most end) the next cathode structure (e.g. at its lower most end) with an aluminum wettable portion (e.g. members, tiles, aluminum wettable coatings, and/or combinations thereof), in accordance with the instant disclosure.

Figure 8:
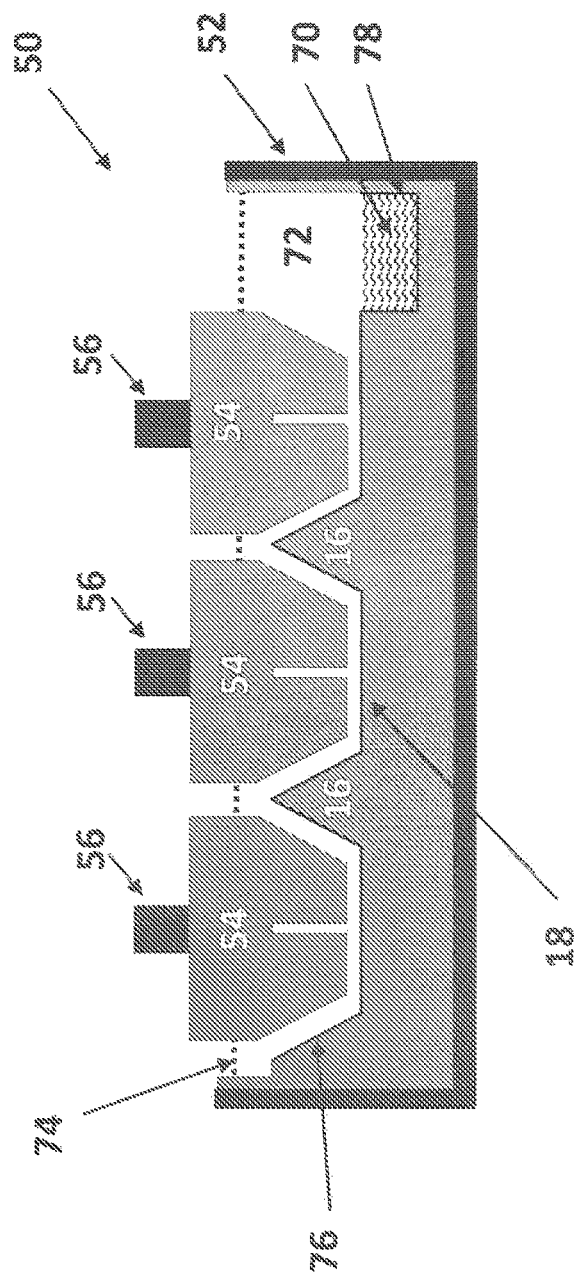

FIG. 8 depicts a schematic cut away side view of an embodiment of an electrolysis cell, depicting a cathode assembly and corresponding anodes with anode profiles configured to accommodate the cathode structures of the cathode assembly, in accordance with the present disclosure.

As shown in FIG. 8, the cathode structures are configured to extend in a spaced relation (e.g. alternating between corresponding anodes) with cathode portions configured to extend from a lower end of one cathode structure beneath the lower surface of the corresponding anode and adjacent to the cathode floor, to a position adjacent to a lower portion of the neighboring cathode structure, in accordance with the present disclosure.

FIG. 9A depicts a partial top plan view of an electrolysis cell, depicting a sump along an end of the cell, in accordance with the instant disclosure.

FIG. 9B depicts a top plan view of an electrolysis cell, depicting two sumps extending from side to side, along the middle portion of the cell, in accordance with the instant disclosure.

FIG. 9C depicts a top plan view of an electrolysis cell, depicting two sumps extending along each opposing sides of the cell, in accordance with the instant disclosure.

Figure 10:
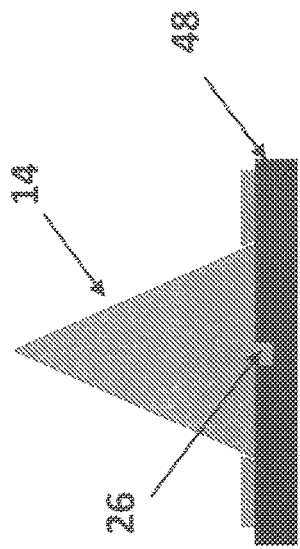

FIG. 9D depicts a partial top plan view of an electrolysis cell, depicting two opposing sumps which extend generally across the middle of the cell and in spaced relation from end to end, in accordance with the instant disclosure FIG. 10 depicts an embodiment illustrating the attachment configuration of the cathode member to the floor of the cell, depicting a male engagement on the lower end/bottom facing portion of the cathode member that corresponds to a female portion in the floor, in accordance with the instant disclosure.

Figure 11:
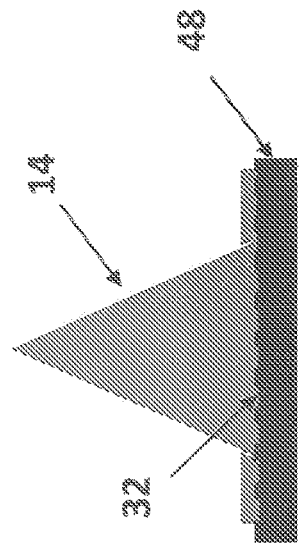

FIG. 11 depicts an embodiment illustrating the attachment configuration of the cathode member to the floor of the cell, depicting an adhesive/glue along the lower end/bottom facing portion of the cathode member that attaches/adheres the cathode member to the floor, in accordance with the instant disclosure.

Figure 12:
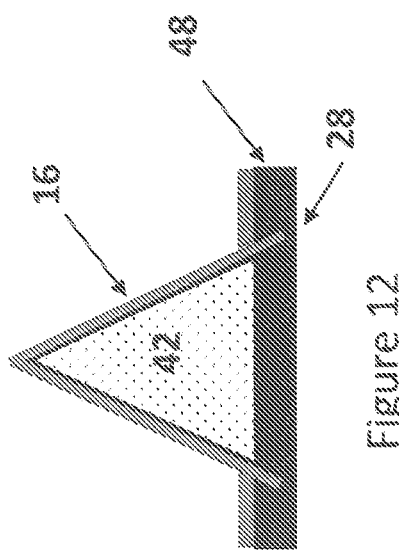

FIG. 12 depicts an embodiment illustrating the attachment configuration of the cathode member to the floor of the cell, depicting two corresponding grooves/attachments sites in the cathode block (extending from the surface of the floor into the cathode block and configured to hold/retain the lower ends of the corresponding cathode plates (and/or tiles) of the cathode structure), in accordance with the instant disclosure.

FIG. 13 depicts a generic configuration of an anode and a cathode in a cell (e.g. cell floor, bath to vapor interface) to generally define three variables, the anode to cathode distance, the anode to cathode overlap, and the cathode height (a percentage of total bath height), in accordance with the present disclosure.

Figure 14A:
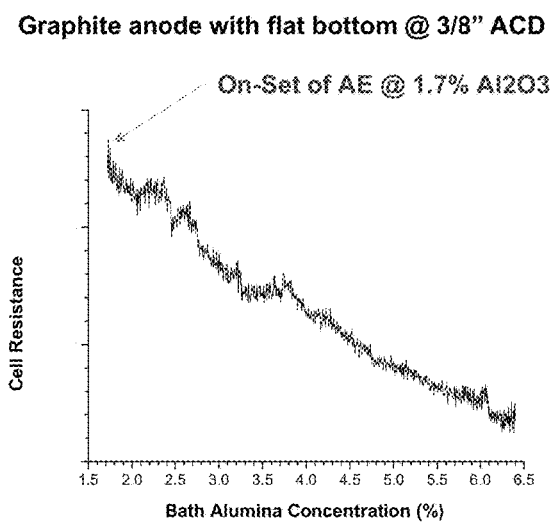

FIG. 14A depicts a graph of the bath alumina concentration vs. cell resistance for a electrolysis cell having a graphite anode with a flat bottom and an ACD of $3/8''$.

Figure 14B:
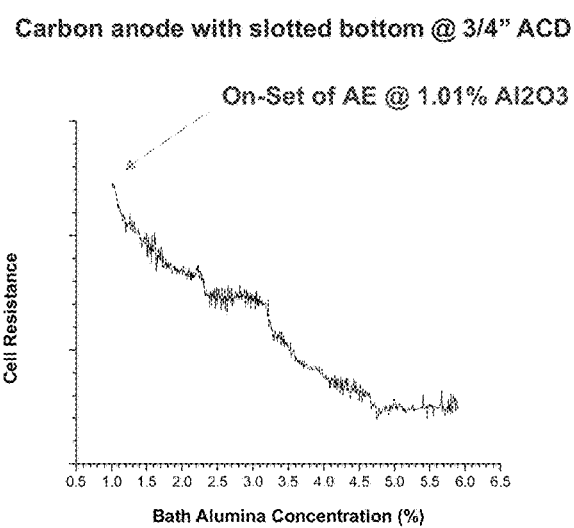

FIG. 14B depicts a graph of the bath alumina concentration vs. cell resistance for a electrolysis cell having a carbon anode with a slotted bottom and an ACD of $3/4''$.

The drawings above are not necessarily to scale, with emphasis instead generally being placed upon illustrating the principles of the present invention. Further, some features may be exaggerated to show details of particular components. These drawings/figures are intended to be explanatory and not restrictive of the invention.

DETAILED DESCRIPTION OF THE INVENTION

Additional aspects and advantages of the present invention will be set forth in part in the description which follows and, in part, will be obvious from the description, or may be learned by practice of the invention.

As used herein, "electrolysis" means any process that brings about a chemical reaction by passing electric current through a material.

In some embodiments, electrolysis occurs where a species of metal is reduced in an electrolytic cell to produce a metal product. Some non-limiting examples of electrolysis include primary metal production. Some non-limiting examples of electrolytically produced metals include: rare earth metals, non-ferrous metals (e.g. copper, nickel, zinc, magnesium, lead, titanium, aluminum, and rare earth metals).

As used herein, "electrolytic cell" means a device for producing electrolysis. In some embodiments, the electrolytic cell includes a smelting pot, or a line of smelting pots (e.g. multiple pots). In one non-limiting example, the electrolytic cell is fitted with electrodes, which act as a conductor, through which a current enters or leaves a nonmetallic medium (e.g. electrolyte bath).

As used herein, "electrode" means positively charged electrodes (e.g. anodes) or negatively charged electrodes (e.g. cathodes).

As used herein, "anode" means the positive electrode (or terminal) by which current enters an electrolytic cell. In some embodiments, the anodes are constructed of electrically conductive materials.

In some embodiments, the anode is constructed from a carbon material (e.g. graphite-based anode, carbon anode).

In some embodiments, the anode is an oxygen evolving anode (sometimes called an inert anode). For example, the inert anode is configured to be dimensionally stable and/or have a corrosion rate significantly less than a corresponding carbon anode. Some non-limiting examples of inert anode materials include: metals, metal alloys, ceramics, cermets, and/or combinations thereof.

As used herein, "anode assembly" includes one or more anode(s) connected with a pin/rod and a support (e.g. to adjust/raise/lower the anode). In some embodiments, the anode assembly includes the corresponding electrical bus work, which is configured to direct current into the anode via the pin.

As used herein, "support" means a member that maintains another object(s) in place. In some embodiments, the support is a cathode support—a structure that retains the cathode plates in place (e.g. in sloped configuration). In some embodiments, the support is in electrical communication with the cathode plates and/or cathode assembly. In some embodiments, the support is an insulator and/or is not configured in electrical communication with the cathode plates and/or cathode assembly.

In one embodiment, the cathode support is constructed of a material that is resistant to attack from the corrosive bath. For example, the support is constructed of refractory material, carbon or carbon composite materials, and/or hollow structure (e.g. filler with sufficient structural support and rigidity to retain the cathode plates in place).

As used herein, "electrical bus work" refers to the electrical connectors of one or more component. For example, the anode, cathode, and/or other cell components can have electrical bus work to connect the components together. In some embodiments, the electrical bus work includes pin connectors in the anodes, the rod/bar to connect the anodes and/or cathodes, electrical circuits for (or between) various cell components, and combinations thereof.

As used herein, "cathode" means: the negative electrode or terminal by which current leaves an electrolytic cell. In some embodiments, the cathode is electrically connected through the bottom of the cell (e.g. current collector bar and electrical buswork).

In some embodiments, the cathodes are constructed of an electrically conductive, aluminum wettable material.

As used herein, "wettable" means: a liquid/molten material having a contact angle on a solid surface not greater than 90 degrees.

Some non-limiting examples of the cathode material include: transition metal borides (e.g. titanium borides, zirconium borides; hafnium borides); metal borides and carbon composite materials; and/or combinations thereof.

As used herein, "cathode assembly" refers to the cathodic portion of the electrolysis cell configured to remove current from the cell. As a non-limiting example, the cathode assembly includes the following components: current collector subassembly/ies, current collector bar(s), cathode block, cathode structure(s) (e.g. configured with cathode members (plates, tiles, cathode coatings), support members), mechanical attachment device(s) and corresponding attachment component(s), adhesive/glue, cathode portion(s) (e.g. configured to attach to the floor in a generally horizontal position and extend between cathode structures), sump(s), the electrical buswork, and/or combinations thereof.

As used herein, "cathode structure" means: the cathode components (e.g. monolithic blocks, cathode plates positioned on a support member (e.g. with optional adhesives, or attaching components), cathode tiles positioned on a support member (e.g. with optional adhesives, or attaching components), cathode coatings positioned on a support member, adhesives to join/adhere the components together, mechanical attachment devices and corresponding attachment components on the cathode structure, and/or combinations thereof.

In some embodiments, the cathode structure is in communication with the cell bottom and extends upward from the cell bottom. In some embodiments, the cathode structure is in communication with the metal product/metal pad (e.g. metal formed on the surface of the cathode structure). In some embodiments, the cathode structure is at a height which is below the bath-air interface. In some embodiments, the cathode structure is located in the electrolyte bath.

In some embodiments, multiple cathode plates are connected (e.g. mechanically and electrically) to the cathode support. In some embodiments, 2, 4, 6, 8, or more cathode plates are attached to a cathode support.

In some embodiments, the electrical connection is provided to the cathode structures by the metal pad. In some embodiments, the electrical connection is provided to the cathode structures by contact with a cathodically polarized cell bottom.

In some embodiments, the angle of the cathode structure wall (beta) is at least 5° to not greater than 89°.

In some embodiments, the angle of the cathode structure wall (beta) is at least 15° to not greater than 75°.

In some embodiments, the angle of the cathode structure wall (beta) is at least 30° to not greater than 65°.

In some embodiments, the angle of the cathode structure wall (beta) is at least 15° to not greater than 35°.

In some embodiments, the angle of the cathode structure wall (beta) is at least 55° to not greater than 75°.

In some embodiments, the angle of the cathode structure wall angle (sloped surface, beta) is: at least 5°; at least 10°; at least 15°; at least 20°; at least 25°; at least 30°; at least 35°; at least 40°; at least 45°; at least 50°; at least 55°; at least 60°; at least 65°; at least 70°; at least 75°; at least 80°; or at least 85°.

In some embodiments, the cathode structure wall angle (sloped surface, beta) is: not greater than 5°; not greater than 10°; not greater than 15°; not greater than 20°; not greater than 25°; not greater than 30°; not greater than 35°; not greater than 40°; not greater than 45°; not greater than 50°; not greater than 55°; not greater than 60°; not greater than 65°; not greater than 70°; not greater than 75°; not greater than 80°; or not greater than 85°.

In some embodiments, the angle of the cathode drain angle (alpha) is 0° (e.g. a flat surface) to not greater than 15°.

In some embodiments, the angle of the cathode drain angle (alpha) is at least 0.1° to not greater than 15°.

In some embodiments, the angle of the cathode drain angle (alpha) is at least 1° to not greater than 10°.

In some embodiments, the angle of the cathode drain angle (alpha) is at least 2° to not greater than 5°.

In some embodiments, the angle of the cathode drain angle (alpha) is: at least 1°; at least 5°; at least 10°; or at least 15°.

In some embodiments, the angle of the cathode drain angle (alpha) is: not greater than 1°; not greater than 5°; not greater than 10°; or not greater than 15°.

As used herein, "outer shell" means an outer-most protecting cover portion of the sidewall. In one embodiment, the outer shell is the protecting cover of the inner wall of the electrolytic cell. As non-limiting examples, the outer shell is constructed of a hard material that encloses the cell (e.g. steel).

As used herein, "at least" means greater than or equal to.

As used herein, "not greater than" means less than or equal to.

As used herein "current collector bar" refers to a bar that collects current from the cell. In one non-limiting example, the current collector bar collects current from the cathode and transfers the current to the electrical buswork to remove the current from the system.

As used herein, "electrolyte" means: a medium in which the flow of electrical current is carried out by the movement of ions/ionic species. In one embodiment, an electrolyte may comprise molten salt. Some non-limiting example of the electrolytic bath composition includes: NaF—AlF$_3$ (in an aluminum electrolysis cell), NaF, AlF$_3$, CaF$_2$, MgF$_2$, LiF, KF, and combinations thereof—with dissolved metal compounds (e.g. alumina).

As used herein, "molten" means in a flowable form (e.g. liquid) through the application of heat. As a non-limiting example, the electrolytic bath is in molten form (e.g. at least about 750° C.).

As used herein, "retrofit" means: to modify equipment/facility that is already in service using parts developed or made available.

As used herein, "metal product" means the product which is produced by electrolysis. In one embodiment, the metal product forms at the bottom of an electrolysis cell as a metal pad. Some non-limiting examples of metal products include: aluminum, nickel, magnesium, copper, zinc, and rare earth metals.

As used herein, "metal pad" means: the metal product of electrolysis. In some embodiments, the metal pad forms from molten metal (aluminum metal) that forms on the cathode surface and drains into the cell bottom and/or sump.

As used herein, "sidewall" means the wall of an electrolysis cell. In some embodiments, the sidewall runs parametrically around the cell bottom and extends upward from the cell bottom to defines the body of the electrolysis cell and define the volume where the electrolyte bath is held.

In one aspect of the disclosure, an apparatus is provided (e.g. cathode assembly), comprising: a cathode structure electrically configured in an electrolysis cell to electrolytically participate in metal production, wherein the metal is formed on a surface of the cathode structure, wherein the cathode structure is configured to fit along a floor of an aluminum electrolysis cell (e.g. where the floor is on top of the cathode block or the refractory brick on top of the cathode collector assembly), further wherein the cathode structure is configured with a cathode wall angle having an angled or sloped configuration when compared to a generally horizontal plane (i.e. having an upper end closest to a bath-vapor interface, a lower end configured along the bottom of the cell, and a middle portion positioned between the upper end and the lower end), wherein via the cathode wall angle, the cathode member is configured to drain a metal product from the surface thereof towards the lower end of the cathode structure.

In some embodiments, the cathode structure is configured with a triangular geometry (e.g. with one end lying flat along the bottom of the cell/attached to the bottom of the cell).

In some embodiments, the cathode structure wall angle (e.g. beta) is from 30 degrees to not greater than 89 degrees.

In some embodiments, the cathode structure wall angle (beta) is from 30 degrees to not greater than 80 degrees.

In some embodiments, the upper end of the cathode structure is configured with an angle (e.g. sharp edges).

In some embodiments, the upper end of the cathode structure is configured with an arcuate edge (rounded edge).

In some embodiments, the cathode structure is a monolithic (e.g. unitary) ceramic member (e.g. aluminum wettable ceramic member) that is configured to attach to the cell bottom.

In some embodiments, the lower end of the monolithic ceramic member is configured with a mechanical attachment device (e.g. which is configured to enable mechanical attachment to the cell bottom).

In some embodiments, the lower end of the monolithic cathode member is configured with a male extension portion that is configured to fit into (e.g. and be adhered or glued into) a corresponding female via in the cell bottom (e.g. cathode block).

In some embodiments, the cathode structure comprises a plurality of cathode plates that are configured with their respective upper ends adjacent to one another and corresponding lower ends configured adjacent to one another (e.g. to provide a generally zig-zag pattern when viewed at the cross-section).

In some embodiments, at least two cathode plates are configured to a support member, such that the cathode plates, and not the support member, are in contact with the molten electrolyte bath and/or the metal (metal product).

In some embodiments, the cathode plates are attached to the support member.

In some embodiments, the cathode plates are glued and/or adhered to the support member.

In some embodiments, the cathode plates are mechanically attached to the support member.

In some embodiments, the cathode plates are mechanically attached to the cell bottom (e.g. the portion between the cathode plates is empty, there is no support member or filler material positioned between the cathode plates).

In some embodiments, the support member is configured from refractory materials, a ceramic material (e.g. non-aluminum wettable), a porous filler material, a filler material, a carbonaceous material, a composite material (e.g. carbonaceous and ceramic material) and/or combinations thereof.

In some embodiments, the support member is in electrical communication with the cathode plates. In some embodiments, the support member is not in electrical communication with the cathode plates (e.g. the support member is an electrical insulator material).

In some embodiments, the cathode structure comprises a plurality of cathode members configured in a generally parallel, interspaced configuration along the floor of an electrolysis cell.

In some embodiments, the cathode structure comprises a negative polarization (e.g. is in electrical communication with the cell) via: (1) contact with the metal pad; (2)

attachment with a cathode block configured along the floor/bottom end of the cell; (3) attachment to a cathode collector bar subassembly, and/or combinations thereof.

In some embodiments, the cathode structures are configured as support members configured/attached onto the cathode block (e.g. carbon blocks) along the floor of the cell, with an aluminum wettable coating (e.g. paint) covering the carbonaceous material. (e.g. the coating is dipped, sprayed, painted, rolled, or otherwise applied to the surface of the carbon blocks).

In some embodiments, the cathode structure is configured as an aluminum wettable components that is attached to a non-aluminum wettable (e.g. conductive material/support member configured from carbon) attached to the cathode block along the floor of the cell. Non-limiting examples of the aluminum wettable coating cathode member (e.g. paint) covering the carbonaceous material includes: coatings that are dipped, sprayed, painted, rolled, or otherwise applied to the surface of the non-aluminum wettable components).

In some embodiments, the cathode member comprises a plurality of tiles (e.g. aluminum wettable ceramic tiles) that are adhered into place over a carbon block with a grout or adhesive (e.g. wherein the grout or adhesive comprises an aluminum wettable ceramic material) such that the grout and tiles cooperate in the cathode wall angle as a metal drained cathode surface.

In some embodiments, the cathode members comprise a plurality of tiles (e.g. aluminum wettable ceramic tiles) that are adhered into place over a carbon block with a grout or adhesive (e.g. wherein the grout or adhesive has an aluminum wettable ceramic coating or paint applied to the surface thereof) such that the grout and tiles cooperate in the cathode wall angle as a metal drained cathode surface.

In some embodiments, the cathode members comprise a plurality of tiles (e.g. aluminum wettable ceramic tiles) that are adhered into place over a carbon block with a grout or adhesive; wherein (1) the grout or adhesive comprises an aluminum wettable ceramic material and (2) the grout or adhesive has an aluminum wettable ceramic coating or paint applied to the surface thereof, such that the grout and tiles cooperate in the cathode wall angle as a metal drained cathode surface.

In one aspect of the instant disclosure, the cathode member is configured with a cathode drain angle along the lower end of the cathode (e.g. optionally, in combination with a cathode block that the cathode member(s) is/are configured/attached to), such that the metal product that is drained via the cathode wall angle is further directed by the cathode drain angle into a collection area (e.g. sump) positioned along/adjacent to a cathode area in the cell (e.g. sump is configured/located along side aisle, end aisle, or between cathode members).

In some embodiments, the cathode drain angle is from 0.1 degree to 15 degrees.

In some embodiments, the cathode drain angle is from 1 degree to 5 degrees.

In one aspect of the disclosure, an apparatus is provided, comprising: a cathode member electrically configured in an electrolysis cell to electrolytically participate in metal production, wherein the metal is formed on a surface of the cathode member, wherein the cathode member is configured to fit along a floor of an aluminum electrolysis cell, further wherein the cathode member is configured with a cathode wall angle having an angled or sloped configuration when compared to a generally horizontal plane (i.e. having an upper end closest to a bath-vapor interface, a lower end closest to the bottom of the cell, and a middle portion positioned between the upper end and the lower end), wherein via the cathode wall angle, the cathode member is configured to drain a metal product from the surface thereof towards the lower end of the cathode member; and the cathode member is further configured with a cathode drain angle along the lower end of the cathode (e.g. optionally, in combination with a cathode block that the cathode member(s) is/are configured/attached to), such that the metal product that is drained via the cathode wall angle is further directed by the cathode drain angle into a collection area (e.g. sump) positioned along/adjacent to a cathode area in the cell (e.g. sump is configured/located along side aisle, end aisle, or between cathode members).

In some embodiments, the collection area (e.g. sump) is located along an inner region of the cathode assembly (e.g. remote from the sidewall or end wall).

In some embodiments, the collection area (e.g. sump) is located along a side wall.

In some embodiments, the collection area (e.g. sump) is located along both sidewall (e.g. generally opposed from one another).

In some embodiments, the collection area (e.g. sump) is located along an end wall.

In some embodiments, the collection area (e.g. sump) is located along both end walls (e.g. generally opposed from one another).

In some embodiments, the collection area (e.g. sump) is located along a side wall and an end wall.

In some embodiments, the collection area (e.g. sump) is located along both sidewalls and end walls (e.g. generally perimetrically configured around the inner perimeter of the cell).

In some embodiments, the cathode assembly is configured with a generally horizontal portion (e.g. shelf) between the cathode member having cathode wall angle and the collection portion (e.g. sump).

In some embodiments, the cathode member adjacent to the sump is configured with an extended cathode wall angle such that the metal drains from the cathode member directly into the sump (e.g. no shelf positioned between the member and the collection portion/sump).

In some embodiments the cell is tapped continuously (e.g. to remove metal product form the cell).

In some embodiments, the cell is tapped periodically (to remove metal product from the cell on a recurring, non-continuous frequency).

In some embodiments, an aluminum electrolysis cell is provided, comprising: a cathode assembly configured from a plurality of cathode members having a cathode wall angle sufficient to promote drainage of a metal product towards the lower end of the cathode assembly; an anode assembly, configured from a plurality of anodes, wherein each anode is a monolithic block of carbon having an anode profile configured to correspond to the cathode wall angle of the cathode assembly; where in the cathode members of the cathode assembly and the anodes of the anode assembly are configured in a vertical orientation (e.g. with interspaced anode-cathode-anode-cathode configuration).

In some embodiments, via the anode profile, the anode-to-cathode distance is optimized during electrolytic production of a metal product (e.g. aluminum).

In some embodiments, the anode profile is configured with beveled/angled edges (e.g. sharp edges).

In some embodiments, the anode profile is configured with arcuate edges (rounded edge).

In some embodiments, the anode profile is configured via: machining the anode to configure the anode with a plurality of sloped/beveled edges along its sidewall that correspond to the cathode assembly profile/dimension (e.g. wall angle of cathode members).

In some embodiments, the anode profile is configured via: manufacturing the anode with the anode profile (e.g. mixing pitch and coke; directing the mixture into a mold configured with a green anode profile; vibrating the mixture in the mold to ensure appropriate packing and distribution in the mold; and baking a green anode having a green anode profile, to provide an anode having an anode profile; and pinning the anode with a pin configured to direct an electrical current from the pin into the anode).

In some embodiments, each anode is further configured with at least one anode slot (e.g. a plurality of parallel anode slots) configured along a lower end of the anode (e.g. generally opposite of the generally horizontal portions of the cathode assembly), which are configured to direct bubbles and/or trapped gasses away from the lower end of the anode and into the molten electrolyte bath.

In some embodiments, an aluminum electrolysis cell is provided, comprising: a cathode assembly, having a plurality of cathode members configured with a cathode wall angle (e.g. to direct the molten metal product towards a lower end of the cathode wall, generally adjacent to the bottom/floor of the cell), wherein the cathode assembly is further configured with a cathode drain angle (e.g. to direct the molten metal product into a collection area/sump); an anode assembly configured from a plurality of carbon anodes having an anode profile corresponding to the cathode wall angle and cathode drain angle to promote a generally uniform anode-to-cathode distance (e.g. ranges within an acceptable and/or predetermined threshold); where in the cathode members of the cathode assembly and the anodes of the anode assembly are configured in a vertical orientation (e.g. with interspaced anode-cathode-anode-cathode configuration).

In some embodiments, a method is provided, comprising: removing an anode assembly from a conventional non-ferrous metal electrolytic smelting cell; mechanically attaching a cathode assembly to the cell bottom (e.g. cathode block), wherein the cathode assembly is configured with a plurality of cathode members constructed of an aluminum wettable material, wherein each cathode member is configured a cathode wall angle to promote a metal product to drain from an upper or middle portion of the cathode member to a lower portion of the cathode member; and inserting an anode assembly comprising a plurality of anodes, wherein the anodes are configured with a beveled edge corresponding generally to the cathode wall angle, such that the anode-to-cathode distance is constant (e.g. within a predetermined range) whether measured between the corresponding generally horizontal portions of the cathode assembly and anodes or when measured between the cathode members having a cathode wall angle and the beveled edge of the anodes.

In some embodiments, the method comprises heating a molten salt bath configured in the cell.

In some embodiments, the method comprises, feeding a feedstock material into the cell, wherein the feedstock contains a metal compound (e.g. alumina) of the desired metal product (e.g. aluminum metal).

In some embodiments, the method comprises electrolytically producing metal in the cell (e.g. to transform the metal compound containing feedstock material into a metal product via electrolysis).

In some embodiments, one or more of the aforementioned cathode assemblies are retrofitted into a pre-bake cell (e.g. configured to electrolytically make aluminum metal).

In some embodiments, one or more of the aforementioned cathode assemblies are retrofitted into a Solderberg cell (e.g. configured to electrolytically make aluminum metal).

In some embodiments, the cathode configuration in is in a 3D structure that enables aluminum to be made at an expanded surface (e.g. increased surface areas compared to as in a monolithic cathodic block configured along the cell bottom).

In some embodiments, the 3D cathode configuration enables a corresponding anodic configuration (e.g. monolithic carbon anodic with complementary dimensions and configuration to promote a consistent anode-to-cathode distance as compared to conventional smelting cells, and thus, enables reduced anode-to-cathode distances and corresponding reduction of anode-to-cathode distance and ohmic voltage drop.

In some embodiments, the electrode surface area (e.g. anode-to-cathode working area) is increased as compared to 2D traditional smelting cells.

In some embodiments, the reaction surfaces of the anodes and cathodes is increased.

In some embodiments, the anode the cathode distance is reduced as compared to 2D traditional smelting cells.

In some embodiments, the aluminum productivity per footprint of the cell is increased with the disclosed 3D cell configurations.

In some embodiments, the energy consumption is reduced by unit of aluminum production with low anode to cathode distance (ACD).

In some embodiments, the 3D cells of the present disclosure have an increased cell life as compared to 2D cells.

In some embodiments, the 3D configurations are retrofittable onto existing electrolysis cells (e.g. to configure the retrofitted cell with increased productivity, reduced energy consumption, reduced equivalent CO2 emission while avoiding a large capital investment (e.g. as compared to a 2D cell or greenfield construction of a 2D pot line).

In some embodiments, the present disclosure is directed towards utilizing novel cathode structures (e.g. aluminum drainable cathodes) in an electrolysis cell to enable molten aluminum production on the surface of the cathode structures with combined draining of the molten aluminum (e.g. through Al wettable cathodic surfaces and combined gravitational forces) to drain to a collection area (e.g. sump) for collection (e.g. periodic or continuous tapping). In some embodiments, the cathode structures are configured from or with aluminum wettable material to enable molten metal production on the surface of the cathode structure, thereby (1) increasing the effective surface area to increase metal production in an electrolytic cell and/or (2) reducing the anode cathode distance to reduce energy consumption in the electrolytic cell, as compared with conventional electrolytic cells producing the same metal, without such cathode structures. In some embodiments, the present disclosure is directed toward retrofitting existing smelters with the novel cathode structures described herein. In some embodiments, the cathode structures are configured to reduced anode effect (e.g. reduce formation of greenhouse gases, such as carbon tetrafluoride) and increase the electrolysis cell life.

Reference will now be made in detail to the various embodiments of the present invention. The embodiments are described below to provide a more complete understanding of the components, processes and apparatuses of the present invention. Any examples given are intended to be illustrative, and not restrictive. Throughout the specification and claims, the following terms take the meanings explicitly associated herein, unless the context clearly dictates otherwise. The phrases "in some embodiments" and "in azo embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments of the present invention may be readily combined, without departing from the scope or spirit of the present invention.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

EXAMPLES

A computer modeled simulation was completed, comparing two conventional aluminum smelting technologies (Soderberg smelting and Pre-bake Cell smelting) with these types of smelting, with embodiments of the present disclosure deployed (e.g. in retrofit application—options 1-3 or in Greenfield application). For each of options 1-3 (retrofitting) and the Greenfield option, the cathode structure height was varied, with option 1 being the highest, option 3 being the lowest, and option 2 being a height in the middle. The other two variables, the cathode structure angle and the drain angle were maintained, to values within the defined ranges set forth in the present disclosure. For the Greenfield modeling, the assumptions were that the pot design could vary compared to retrofits (e.g. accommodating a larger pot design, larger buswork and rectifying station, and other design options employed to maximize metal production from the electrolysis cells).

Figures 2A, 2B:
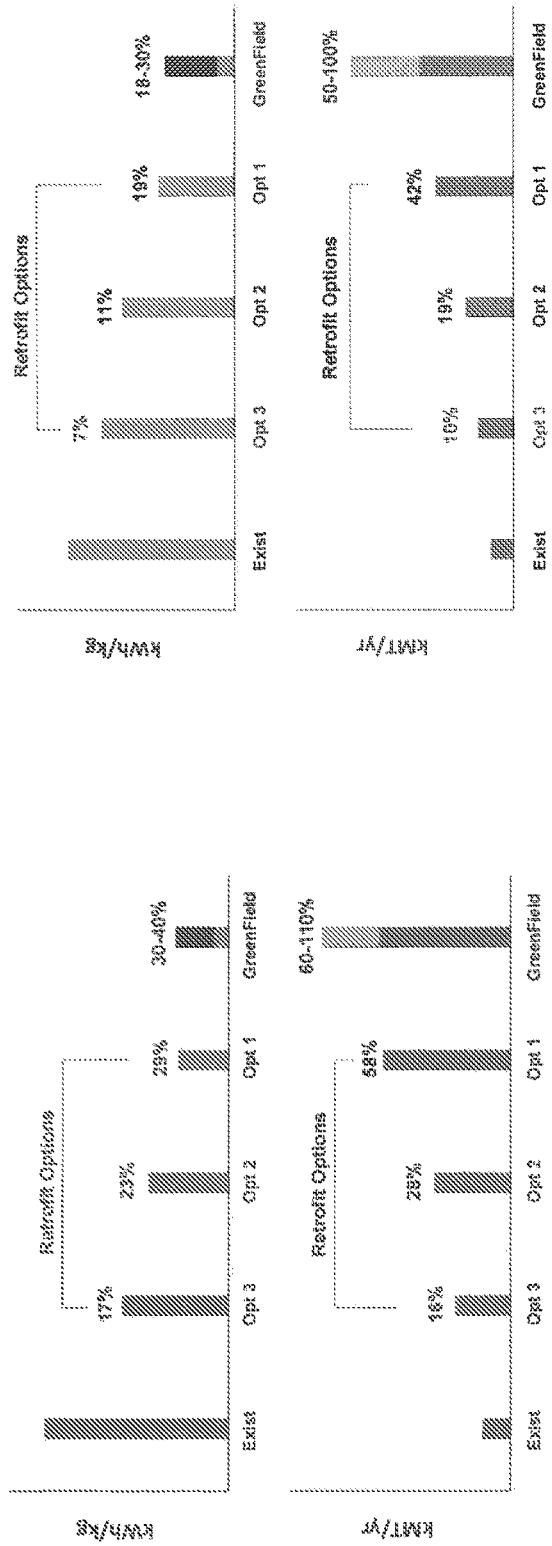
FIG. 2A-B depicts the results of two comparative examples of the disclosed embodiments compared to conventional aluminum production technologies.

FIG. 2A depicts the projected performance of a specific Soderberg smelter vs. 4 embodiments of the present disclosure (option 1-3-retrofitting) and option 4 Greenfield. FIG. 2A (upper graph) depicts the reduction of energy consumption (improved energy use) of the embodiments of the present disclosure when compared to the conventional Soderberg smelter for each retrofit option and the Greenfield option. With all four embodiments, there is a projected improvement in energy consumption (lower energy consumption) when compared to the existing the traditional Soderberg smelter.

FIG. 2A (lower graph) depicts the production capacity (amount of aluminum metal produced per year) of the embodiments of the present disclosure when compared to the conventional Soderberg smelter for each retrofit option and the Greenfield option. With all four embodiments, there is a projected increase production capacity (more aluminum produced) when compared to the existing the traditional Soderberg; smelter.

FIG. 2B, provides a comparative example of a specific Pre-bake cell smelter vs. retrofitting and Greenfield of the Pre-bake cell (pre-bake anode) technology with sloped anode and cathode configurations described herein.

FIG. 2B depicts the projected performance of a specific Pre-bake smelter vs. 4 embodiments of the present disclosure (option 1-3-retrofitting) and option 4 Greenfield. FIG. 2B (upper graph) depicts the reduction of energy consumption (improved energy use) of the embodiments of the present disclosure when compared to the conventional Pre-bake cell smelter for each retrofit option and the Greenfield option. With all four embodiments, there is a projected improvement in energy consumption (lower energy consumption) when compared to the existing the traditional Pre-bake smelter.

FIG. 2B (lower graph) depicts the production capacity (amount of aluminum metal produced per year) of the embodiments of the present disclosure when compared to the conventional Pre-bake cell smelter for each retrofit option and the Greenfield option. With all four embodiments, there is a projected increase production capacity (more aluminum produced) when compared to the existing the traditional Pre-bake cell smelter.

REFERENCE NUMBERS

Apparatus 10
Cathode assembly 12
Cathode member 14
Cathode structure 16
Lower end 18
Middle end 20
Upper end 22
Angled/sloped configuration of cathode structure 24
Mechanical attachment device 26
Male extension portion on cathode member 28
Female attachment portion 30
Adhesive or glue 32
Cathode plates 34
Cathode block 36
Cathode tile 38
Cathodic coating (e.g. aluminum wettable coating) 40
Support member 42
Cathode drain angle 44
Cathode height 46
Cathode block/floor 48
Cell 50
Sidewall 52
Anode 54
Anode assembly 56
Anode pin/rod electrical connection (e.g. structural support) 58
Anode slot 60
Anode edge (e.g. corresponding profile) 62
Anode profile 64
Anode cathode distance 66
Anode cathode overlap 68
Metal product 70
Bath 72
Bath vapor interface 74
Metal bath interface 76
Sump 78
Side 80
End 82
Middle (e.g. interspaced between anode assemblies and cathode assemblies) 84
Auxiliary bus 85

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

The invention claimed is:
1. An apparatus, comprising:

a cathode structure disposed within an electrolysis cell, wherein the electrolysis cell is configured to produce metal on a surface of the cathode structure;
wherein the cathode structure is configured to fit along a floor of the electrolysis cell;
wherein the cathode structure comprises (a) a support member having a first wall and an opposing second wall, and (b) at least two cathode plates attached to a support member;
  wherein a first cathode plate is attached to the first wall of the support member;
  wherein a second cathode plate is attached to the second wall of the support member;
  wherein the at least two cathode plates are configured to be at least partially submerged in a molten electrolyte bath;
wherein the cathode structure has a sloped surface when compared to a generally horizontal plane;
wherein, via the sloped surface, the cathode structure is configured to drain a metal product from the sloped surface towards a carbon floor of the electrolysis cell.

2. The apparatus of claim 1, wherein the cathode structure has a triangular geometry.

3. The apparatus of claim 1, wherein the sloped surface of the cathode structure has a wall angle of from 15 degrees to not greater than 89 degrees.

4. The apparatus of claim 1, wherein a height of the cathode structure is from 5% to 95% of a height of the molten electrolyte bath.

5. The apparatus of claim 1, wherein the cathode structure is one of a plurality of cathode structures, wherein a cathode assembly comprises the plurality of cathode structures, and wherein the plurality of cathode structures are disposed in a generally parallel, interspaced configuration along the floor of the electrolysis cell.

6. The apparatus of claim 1, wherein the support member comprises a carbon block, wherein the first wall is a first carbon block wall, wherein the second wall is a second carbon block wall, wherein the first cathode plate is attached to the first carbon block wall, and wherein the second cathode plate is attached to the second carbon block wall.

7. The apparatus of claim 1, wherein the floor comprises a cathode drain angle.

8. The apparatus of claim 7, comprising a collection area adjacent the floor, wherein the cathode drain angle of the floor is sufficient to direct the metal product to the collection area.

9. The apparatus of claim 7, wherein the cathode drain angle is from 0 degrees to 15 degrees.

10. The apparatus of claim 9, wherein the cathode drain angle is from 0.1 degrees to 15 degrees.

11. The apparatus of claim 10, wherein the cathode drain angle is from 1 degree to 5 degrees.

12. The apparatus of claim 1, wherein the cathode plates are fully submerged in the molten electrolyte bath.

13. The apparatus of claim 1, wherein the cathode support comprises a male member extending from a bottom portion of the cathode support member;
  wherein the cathode floor comprises a female portion configured to receive the male member of the cathode support;
  wherein the cathode support is connected to the cathode floor via engagement of the male member of the cathode support with the female portion of the cathode floor.

14. The apparatus of claim 1, wherein the cathode floor comprises a first slot and a second slot, wherein the first cathode plate sits in the first slot, and wherein the second cathode plate sits in the second slot.

15. The apparatus of claim 1, wherein the support member is constructed of a first material, and wherein the first cathode plate is constructed of a second material, wherein the first material is different than the second material.

16. The apparatus of claim 15, wherein the first material is non-aluminum wettable and wherein the second material is aluminum wettable.

17. The apparatus of claim 16, wherein the second material is a metal boride.

18. The apparatus of claim 17, wherein the metal boride comprises a titanium boride.

19. The apparatus of claim 15, wherein the first material is selected from the group consisting of a refractory material, a non-aluminum wettable ceramic material, a carbonaceous material, a composite carbon-ceramic material, and combinations thereof.

20. The apparatus of claim 1, wherein the first plate and the second plate connect near an apex of the support member.

21. A cathode for an aluminum electrolysis cell, the cathode comprising:
  a supporting block having at least a first wall, wherein the first wall comprises a wall angle (beta) of from 15 degrees to not greater than 89 degrees relative to vertical;
  a plurality of tiles attached to the first wall, wherein at least some of the plurality of tiles are constructed from an aluminum wettable material.

22. The cathode of claim 21, wherein the aluminum wettable material is a metal boride.

23. The cathode of claim 22, wherein the metal boride is a titanium boride.

* * * * *